(12) United States Patent
Takahashi et al.

(10) Patent No.: US 8,900,700 B2
(45) Date of Patent: Dec. 2, 2014

(54) TRANSFER FILM AND SYNTHETIC RESIN PRODUCT DECORATED WITH THE TRANSFER FILM

(75) Inventors: Eiichi Takahashi, Fujioka (JP); Yasuyuki Imaizumi, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 952 days.

(21) Appl. No.: 11/664,516

(22) PCT Filed: Feb. 27, 2006

(86) PCT No.: PCT/JP2006/003609
§ 371 (c)(1),
(2), (4) Date: Apr. 3, 2007

(87) PCT Pub. No.: WO2006/093091
PCT Pub. Date: Sep. 8, 2006

(65) Prior Publication Data
US 2008/0138550 A1    Jun. 12, 2008

(30) Foreign Application Priority Data

Feb. 28, 2005   (JP) ................................. 2005-054649

(51) Int. Cl.
*B32B 7/12*       (2006.01)
*B32B 27/00*      (2006.01)
*B65D 35/08*      (2006.01)
*B44C 1/17*       (2006.01)
*B32B 27/32*      (2006.01)
*B29C 47/00*      (2006.01)

(52) U.S. Cl.
CPC ................ *B32B 27/00* (2013.01); *B65D 35/08* (2013.01); *B29C 47/00* (2013.01); *B44C 1/1716* (2013.01); *B29C 47/0021* (2013.01); *B32B 27/32* (2013.01); *Y10S 428/914* (2013.01)

USPC ......... 428/354; 428/41.7; 428/41.3; 428/346; 428/347; 428/355 R; 428/355 EN; 428/355 CN; 428/914

(58) Field of Classification Search
None
See application file for complete search history.

(56) References Cited

U.S. PATENT DOCUMENTS 3,666,516 A * 5/1972 Dunning ...................... 428/162
3,922,435 A * 11/1975 Asnes .......................... 428/349
(Continued)

FOREIGN PATENT DOCUMENTS

EP   1 872 969 A1 * 1/2008
EP   1 876 035 A1 * 1/2008
(Continued)

OTHER PUBLICATIONS

Koichi Kimura, "Transfer Sheet, Manufacturing Method Thereof, and Film Formation Method Using This Sheet", English translation of JP 2002-20704, Jan. 23, 2002.*

(Continued)

*Primary Examiner* — Hai Vo
*Assistant Examiner* — Anish Desai
(74) *Attorney, Agent, or Firm* — Oliff PLC

(57) ABSTRACT

The technical problem to be solved by this invention is to give the transfer film a laminar structure that gives no damage to the decorative layer and is resistant to impact, a long period of use, and extensive deformation caused by repeated squeezes. The objects of this invention are to provide the transfer film in which the decorativeness is never damaged by the cracking, abrasion, or peeling during the period of use and also to provide synthetic resin molded products decorated with this transfer film. The solution to the above-described technical problem is a transfer film comprising a base film of a synthetic resin, a protective film of another synthetic resin peelably laminated to the base film, an adhering layer to be adhered to an article to be decorated, and a printed or vapor-deposited decorative layer sandwiched between the protective film and the adhering layer.

10 Claims, 5 Drawing Sheets

(56) References Cited

U.S. PATENT DOCUMENTS

| | | | |
|---|---|---|---|
| 4,243,619 A * | 1/1981 | Fraser et al. | 264/40.6 |
| 4,421,816 A * | 12/1983 | Arnold | 428/202 |
| 4,552,431 A * | 11/1985 | Allemand et al. | 385/143 |
| 4,778,729 A * | 10/1988 | Mizobuchi | 428/32.7 |
| 4,801,514 A * | 1/1989 | Will et al. | 429/167 |
| 4,927,709 A * | 5/1990 | Parker et al. | 428/352 |
| 5,380,587 A * | 1/1995 | Musclow et al. | 428/353 |
| 5,676,785 A * | 10/1997 | Samonides | 156/244.11 |
| 5,981,009 A * | 11/1999 | Iacono et al. | 428/40.1 |
| 6,461,722 B1 * | 10/2002 | Kittel et al. | 428/32.51 |
| 6,509,075 B1 * | 1/2003 | McCurry et al. | 428/40.1 |
| 6,773,653 B2 * | 8/2004 | Miller et al. | 264/447 |
| 8,475,892 B2 * | 7/2013 | Lin et al. | 428/32.6 |
| 2002/0015828 A1 * | 2/2002 | Ast | 428/195 |
| 2011/0159255 A1 * | 6/2011 | Lin et al. | 428/202 |

FOREIGN PATENT DOCUMENTS

| | | | | |
|---|---|---|---|---|
| JP | A 03-039243 | 2/1991 | | |
| JP | A 10-071799 | 3/1998 | | |
| JP | A 2002-252545 | 9/2002 | | |
| JP | U 3107994 | 4/2005 | | |
| WO | WO9005088 A1 * | 5/1990 | | B65C 3/12 |
| WO | WO2004050384 A1 * | 6/2004 | | B44C 1/17 |

OTHER PUBLICATIONS

Sota Asahin, "Transfer Sheet", English translation of JP 03-107994U, Apr. 7, 2005.*

Takahashi, Eiichi and Imizumi, Yasuyuki, "Transfer Film, and Synthetic Resin Molded Product Having Decoration Formed by Transfer Film", Abstract of WO2006/093091A1, Sep. 8, 2006.*

Takahashi, Hidekazu et al., "Transfer Film", abstract of JP 2006-281518A, Oct. 19, 2006.*

Takahashi, Hidekazu and IMaizumi, Yasuyuki, "Tranfer Film and Synthetic Resin Molded Article", abstract of JP 2007-326224A, Dec. 20, 2007.*

* cited by examiner (a)

(b)

Prior Art

TRANSFER FILM AND SYNTHETIC RESIN PRODUCT DECORATED WITH THE TRANSFER FILM

TECHNICAL FIELD

This invention relates to a transfer film used for a decorative purpose and a synthetic resin molded product decorated with this transfer film.

BACKGROUND ART

As the methods of decorating surfaces of synthetic resin molded products, a label is attached to the wall or transfer film is used. Patent Document 1, for example, describes an invention relating to transfer film. FIG. 6 shows a typical example of conventional transfer film described in Patent Document 1. As shown in FIG. 6, this transfer film 101 comprises a base film 102, a release layer 106, a printed layer 112, and an adhering layer 107.

The transfer film 101 is heated and pressed by an in-mold process, a hot-stamping process, or a hot rolling process. The adhering layer 107 is adhered to the surface of a molded product to transfer the printed layer 112 to the surface, and thus the decorativeness of the film is fulfilled. The base film 102 is separated and removed with the release layer 106. The printed layer 112 may be further vapor-deposited with a metal.

[Patent Document 1] Japanese Patent Application No. P2002-252545

DISCLOSURE OF THE INVENTION

Problems to be Solved by the Invention

However, scratches and cracks occurred to the printed layer derived from this transfer film, or the printed layer peeled off, thus giving damage to the external appearance. In the applications to cosmetics, external appearance of the container has a large effect on the merchantability of products. Therefore, these damages raise a problem of decreased product image. This problem is more remarkable in the tubular containers or blow molded, thin-wall containers, especially in those containers of the type in which the body is repeatedly squeezed and deformed to discharge the contents.

As a countermeasure against the occurrence of scratches, a conventionally utilized method involves coating the decorative layer, such as the printed layer, with a hard coat layer using an acrylic resin of a UV-curing type so that abrasion resistance is given to the surface of the printed layer. This hard coat layer, too, suffers cracking due to impact shock, a long period of use, or the influence of ingredients of the contents that may stain this hard coat layer, and thus the problem of damaged appearance still remains unsolved.

Another problem is that cracks cannot be prevented from occurring even in a short period if the container is put under a severe condition, such as repeated squeezes and deformation. Especially when the transfer film is wrapped around the body of a tubular container or a blow molded container circumferentially, this problem becomes severer because there is no allowance for the deformation caused by repeated squeezes.

This invention has been made to solve the above-described problems. The technical problem to be solved by this invention is to give the transfer film a laminar structure in which the decorative layer receive no damage from impact shock, a long period of use, and extensive deformation caused by repeated squeezes. The objects of this invention are to provide a transfer film in which the decorativeness is never damaged by the cracking, abrasion, or peeling during the period of use and also to provide a synthetic resin molded product decorated with this transfer film.

Means of Solving the Problems

The means of carrying out the invention according to a first embodiment to solve the above-described technical problem is a transfer film comprising a base film of a synthetic resin, a transfer layer comprising in order a protective film of a synthetic resin made of polyethylene, polypropylene or polystyrene and having a sufficient flexibility peelably laminated with the base film, a first adhesive layer adhered to the protective film, a printed or vapor-deposited decorative layer, and an adhering layer to be adhered to the molded product to be decorated, wherein the protective film has sufficient flexibility so that the transfer layer can fully follow on extensive deformation caused by repeated squeezes, and ensure that the printed or vapor-deposited decorative layer is protected against peeling, scratches, or cracking, and wherein the protective film forms an outer exposed surface of the transfer layer after the base film is removed.

The transfer film having the configuration described in the first embodiment is laminate film having the base film made of a synthetic resin, the protective film made of a synthetic resin, and the adhering layer. The transfer film is applied to the container by attaching the adhering layer to the wall to be decorated and peeling off the base film. (The portion of the transfer film, which is adhered to the wall to be decorated and from which the base film has been peeled off, is hereinafter referred to as the transferred layer.) The transfer film of the first embodiment is not protected by the conventional hard coat layer, but the printed or vapor-deposited decorative layer is always covered with, and protected by, the protective film. For example, commonly used general-purpose synthetic resins, such as polyethylene (PE), polypropylene (PP), and acrylonitrile-styrene copolymer (AS) resin (a styrene-acrylonitrile resin), can be utilized to make this protective film sufficiently flexible. Therefore, the transferred layer can fully follow on extensive deformation caused by repeated squeezes, and ensures that the printed or vapor-deposited decorative layer is protected against peeling, scratches, or cracking. Thus, the decorated container can be used without giving any damage to the original condition of decorativeness.

The use of the transfer film is not limited to those containers which are squeezed and deformed. If ordinary synthetic resin molded products are decorated with this transfer film having sufficient flexibility, the surface of the decorated container can be prevented from the shock of impact that occurs when something sharp butts the surface. The transfer film can also protect the container surface against cracks caused by a long period of use. If the transfer film of this invention is used to decorate the injection-molded compact cases for which a high grade of decorativeness is required, this high-grade decorativeness can be maintained without getting damage from impact shock or a long period of use. Furthermore, a soft feel can be attached to the surface, depending on the uses.

The means of carrying out the invention of a second embodiment comprises that, in the invention of the first embodiment, a decorative film of a synthetic resin is laminated between the first adhesive layer and the adhering layer and wherein the printed or vapor-deposited decorative layer is formed at least on either surface of the decorative film.

The decorative film is made of a synthetic resin material having highly decorative properties, such as printability or adhesiveness of the printed layer. Suitably selected materials can form a clear decorative layer of a high grade, increase the adhesive strength of the decorative layer including the printed layer, and fully withstand impact shock, a long period of use, and extensive deformation caused by repeated squeezes. The decorative layer can be formed on either or both sides of the decorative film.

The means of carrying out the invention of claim 3 comprises that in the invention of the first and second embodiments, the adhering layer comprises the adhering film of a synthetic resin, which can be directly adhered by heat seal to the wall of the article to be decorated.

Under the above-described configuration of a third embodiment, the adhering film used as an adhering layer is adhered by heat seal directly to the wall of the article to be decorated. Because adhesive strength is large, the transferred layer can be used without being peeled off or wrinkled under impact shock, a long period of use, and extensive deformation caused by repeated squeezes, and the initial state of decorativeness can be maintained securely. In order to ensure that the adhering film is directly adhered by the heat seal to the wall of the article to be decorated, the adhering film is optimally made of a material of the same nature as the wall of the article to be decorated.

The means of carrying out the invention of a fourth embodiment comprises that, in the invention of the first, second, or third embodiments, the protective film is laminated peelably and directly with the base film by an extrusion laminating process.

Under the above-described configuration of the fourth embodiment, the base film can be easily peeled from the transferred layer without requiring any release layer. The base film and the protective film are made of the synthetic resins that are less compatible with each other. A molten resin, the raw material for the protective film, is extruded from T die equipped with an extruder and is laid over the base film by the extrusion laminating process. The protective film thus obtained is thermally pressed to the base film by a hot roll. After cooling, the protective film is in tight contact with the base film, but can be easily peeled from the base film.

The means of carrying out the invention of a fifth embodiment comprises that, in the invention of the second, third, or fourth embodiment, the transfer film comprises the base film of a polyethylene terephthalate (PET) resin, the protective film of a low-density polyethylene resin (LDPE), and the decorative film of a nylon resin.

The above-described configuration of the fifth embodiment is an illustrative embodiment of laminar structure. The PET film, especially the biaxially drawn PET film, has high transparency and heat resistance and is available at a relatively low price. Because the PET film is elastic and yet sturdy, it can fulfill its excellent function as the base film. LDPE has a high extrusion laminating property. Among ordinary synthetic resins, the LDPE has a relatively flexible property, and can fully prevent cracks from occurring in the decorative layer. In addition, with its high transparency, the LDPE is one of the most suitable materials for the protective film. Nylon resins excel in the decorativeness, such as printability, and enable the decorative layer to have enhanced contact strength. Nylon has also high heat resistance, and can fulfill excellent functions as the decorative film.

Under the above-described configuration, the protective film can be laminated onto the base film by the extrusion laminating process. The base film can be laminated with the decorative film by a dry lamination process, with the adhesive layer disposed in between. If the article to be decorated is, e.g., a polyethylene tubular container or a blow molded container, the adhesive layer based on the adhering film of LDPE can be heat-sealed directly to the wall surface of the container as long as the LDPE adhering film is laminated with the decorative film by the adhesive layers.

The means of carrying out the invention of a sixth embodiment comprises that a molded product of synthetic resins utilizes a transfer film, which has a base film of a synthetic resin, a transfer layer comprising in order a protective film of a synthetic resin made of polyethylene, polypropylene or polystyrene and having sufficient flexibility peelably laminated to the base film, a first adhesive layer adhered to the protective film, a printed or vapor-deposited decorative layer, and an adhering layer to be adhered to the molded product to be decorated, and that the wall of the molded product is decorated in a thermal transfer process while adhering the adhering layer to the wall and peeling off the base film, wherein the protective film has sufficient flexibility so that the transfer layer can fully follow on extensive deformation caused by repeated squeezes, and ensure that the printed or vapor-deposited decorative layer is protected against peeling, scratches, or cracking, and wherein the protective film forms an outer exposed surface of the transfer layer after the base film is removed.

Under the configuration of the sixth embodiment, the synthetic resin molded product can be used without giving damage to the decorativeness because the protective film layer fulfills its protective function to prevent the decorative layer, such as the printed layer, from peel-off or cracks. Therefore, this invention can provide a synthetic resin molded product that shows no vulnerability to the damage to high-grade decorativeness required especially in the fields where the decorative state gives large effects on the merchantability.

The means of carrying out the invention of a seventh embodiment comprises that the molded product in the invention of a sixth embodiment is a tubular container.

The tubular container according to the seventh embodiment can be used without giving damage to the decorativeness even under the condition of repeated squeezes and deformation and under the severe condition in which the transfer film is wrapped entirely around the body of the container. This is because the protective film layer fulfills its protective function to prevent the decorative layer, such as the printed layer, from peel-off or cracks. Therefore, the invention according to the seventh embodiment can provide a tubular container that shows no vulnerability to the damage to high-grade decorativeness required especially in the fields where the decorative state gives large effects on the merchantability as in the application to cosmetics.

The means of carrying out the invention of an eighth embodiment comprises that the molded product in the invention of the seventh embodiment is a blow molded container.

The blow molded container according to the eighth embodiment can be used without giving damage to the decorativeness even under the condition of repeated squeezes and deformation and under the severe condition in which the transfer film is wrapped entirely around the body of the container. This is because the protective film layer fulfills its protective function to prevent the decorative layer, such as the printed layer, from peel-off or cracks. Therefore, this invention according to the eighth embodiment can provide a blow molded container that shows no vulnerability to the damage to high-grade decorativeness required especially in the fields where the decorative state gives large effects on the merchantability as in the application to cosmetics.

Effects of the Invention

This invention described above has the following effects:

In the invention of a first embodiment, the entire surface of the decorative film is covered with a protective film. Therefore, the transferred layer can fully follow on extensive deformation caused by repeated squeezes, and ensures that the printed or vapor-deposited decorative layer is protected against peeling, scratches, or cracking. Thus, the decorated container can be used without giving any damage to the original condition of decorativeness.

In the invention of a second embodiment, the decorative film is made of a synthetic resin material having highly decorative properties, such as printability or adhesiveness of the printed layer. Suitably selected materials can form a clear decorative layer of a high grade and increase the adhesive strength of the decorative layer including the printed layer.

The invention of a third embodiment makes it possible to adhere the decorative film to the article to be decorated more strongly than ever and to prevent effectively the peel-off and the wrinkle occurrence caused by impact shock, a long period of use, and significant deformation caused by repeated squeezes. The initial state of high-grade decorativeness can be maintained reasonably.

In the invention of a fourth embodiment, the base film can be peeled easily from the transferred layer without requiring a release layer.

The configuration of a fifth embodiment is an illustrative embodiment of laminar structure in which the transfer film is formed. For example, the transfer film comprises the base film made of PET, the protective film made of LDPE, and the decorative film made of a nylon resin. Under this structure, each layer can fully perform the required function. On the whole, the transfer film has high processability, transferability, and decorativeness.

According to the invention of a sixth embodiment, the synthetic resin molded product can be used without giving damage to the decorativeness because the protective film layer fulfills its protective function to prevent the decorative layer, such as the printed layer, from peel-off or cracks. Therefore, this invention can provide a synthetic resin molded product that shows no vulnerability to the damage to high decorative quality required especially in the fields where the state of decorativeness gives large effects on the merchantability.

According to the invention of a seventh embodiment, a tubular container is provided, which can be used by squeezing and deforming the body repeatedly without giving damage to the decorativeness of high grade.

According to the invention of an eighth embodiment, a blow molded container is provided, which can be used by squeezing and deforming the body repeatedly without giving damage to the decorativeness of high grade.

EXPLANATION OF CODES

Figure 1:
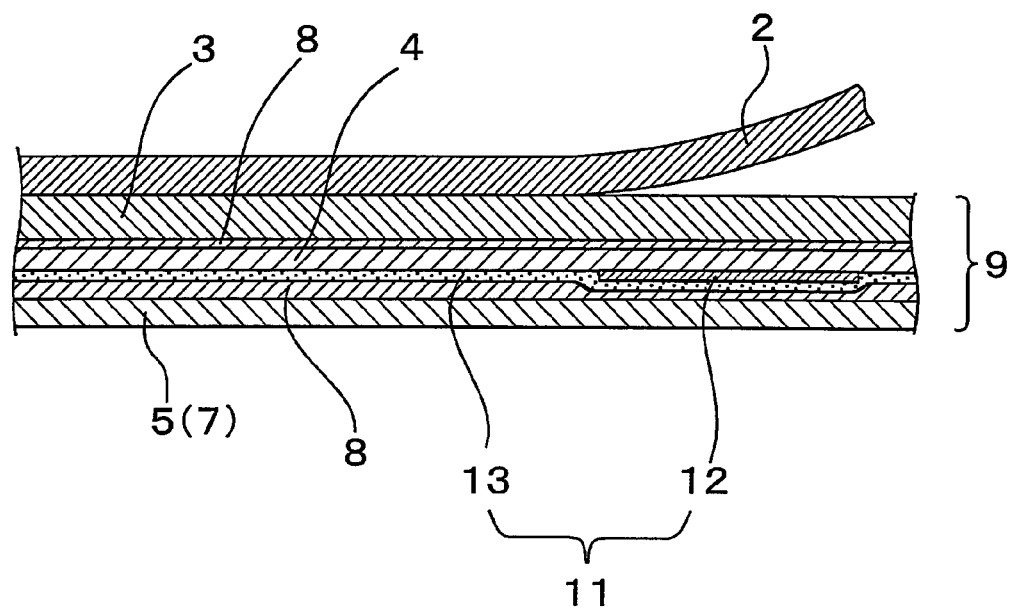
FIG. 1 is a vertical section showing the laminar structure of the transfer film in one embodiment of this invention.

1. Transfer film
2. Base film
3. Protective film
4. Decorative film
5. Adhering film
7. Adhering layer
8. Adhesive layer
9. Transferred layer
11. Decorative layer
12. Printed layer
13. Vapor-deposited layer
21. Tubular container
22. Body wall
23. Head
24. Window
101 Transfer film
102. Base film
106. Release layer
107. Adhering layer
112. Printed layer
HR Hot roll
C Core jig

Preferred Embodiments of the Invention

This invention is further described with respect to the preferred embodiments, now referring to the drawings, in which FIG. 1 is a vertical section showing the laminar structure of the transfer film in one embodiment of this invention. In FIG. 1, this transfer film is laminate film comprising, from top to bottom, the base film 2 (a drawn PET-film), the protective film 3 of LDPE, an adhesive layer 8, the decorative film 4 of a nylon resin, the printed layer 12, an aluminum vapor-deposited layer 13, another adhesive layer 8, and the LDPE adhering film 5 serving as the adhering layer 7. For the convenience of explanation, the structure of the transfer film may be described by distinguishing between top and bottom of the transfer film as shown in the vertical direction in FIG. 1.

The base film 2, the protective film 3, the decorative film 4, and the adhering film 5 have a thickness of 25, 30, 15, and 15 microns, respectively. The protective film 3 is obtained by extruding molten LDPE from a T-die to form film on top of the base film 2 and hot-pressing and laminating both sheets of film by the extrusion laminating process. The base film 2 and the protective film 3 are laminated and in tight contact with each other, but can be easily separated because the PET and the LDPE are less compatible with each other. In FIG. 1, a portion of the base film 2 on the right end is shown in a state that has been separated from the transferred layer 9.

In this embodiment, the printed layer 12 and the aluminum vapor-deposited layer 13 of the decorative layer 11 are formed on the underside of the decorative film 4. The protective film 3 and the decorative film 4 having the decorative layer 11 are laminated by the dry lamination process, with an adhesive layer 8 placed in between. The decorative film 4 and the adhering film 5 are also laminated similarly by using another adhesive layer 8.

The decorative layer 11 in this embodiment comprises a printed layer 12, which is formed at intervals on the underside of the decorative film 4, and an aluminum vapor-deposited layer 13 laid over the entire underside of the decorative film 4 so as to cover this printed layer 12. It is also possible for the printed layer 12 to be formed partially or entirely over the surface of the decorative film 4. The decorative layer 11 may not necessarily be formed on the underside of the decorative film 4. The printed layer 12 can be formed on one surface of the decorative film 4, and the vapor-deposited layer 13 can be formed on the other surface. Thus, the decorative layer 11 can be formed in various manners, depending on the intended decorative effects.

Figure 2:
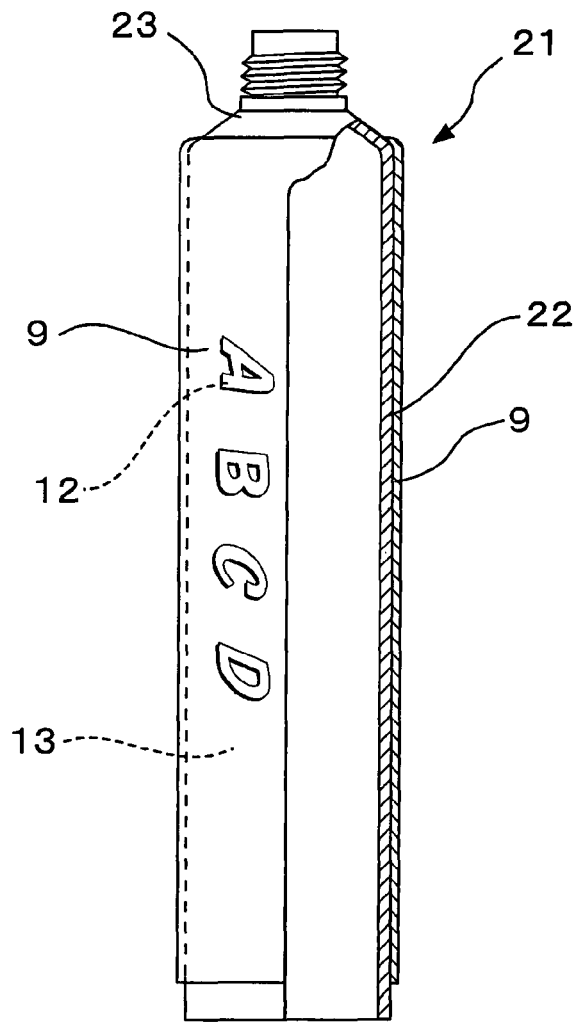
FIG. 2 includes (a) a front elevational view, and (b) a cross-sectional plan view, of the tubular container in an embodiment of the synthetic resin molded products of this invention.
Figure 2:
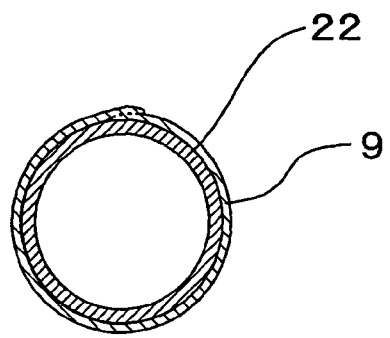

FIG. 2 shows (a) a front elevational view, and (b) a cross-sectional plan view, of the body of a tubular container in an embodiment of the synthetic resin molded product of this invention. This tubular container 21 is made of LDPE, and comprises a cylindrical tubular molded product that has been extrusion-molded and cut in an appropriate length and has had a head 23 fitted to the body by the heat seal in an exclusive mold.

The body has been decorated over the roughly entire height and around the entire circumference by using the transfer film shown in the above-described FIG. 1. The transferred layer 9 has been transferred to the body wall 22 so as to perform the desired decorative function in a later-described hot rolling process in which the adhering film 5 (the adhering layer 7) of the transfer film 1 is adhered to the body wall 22 while peeling off and removing the base film 2 at the same time.

The transfer film in the embodiment shown in FIG. 1 has the printed layer 12 formed at intervals on the underside of the decorative film 4. Furthermore, the aluminum vapor-deposited layer 13 is laid over the roughly entire underside surface so as to cover the printed layer 12. Referring to FIG. 2(a), stylized letters ABCD of the printed layer 12 are designed in the metallic background formed over the entire body surface by the aluminum vapor-deposited layer 13. The decorative designs can also be laid out over the entire body surface of the container, thus providing high-grade decorations and giving sophisticated images to the products.

The adhering layer 7 of the transfer film 1 shown in FIG. 1 is the adhering film 5 made of LDPE and is heat-sealed and directly adhered to the body wall 22 of the tubular container 21 by the hot rolling process.

Figure 3:
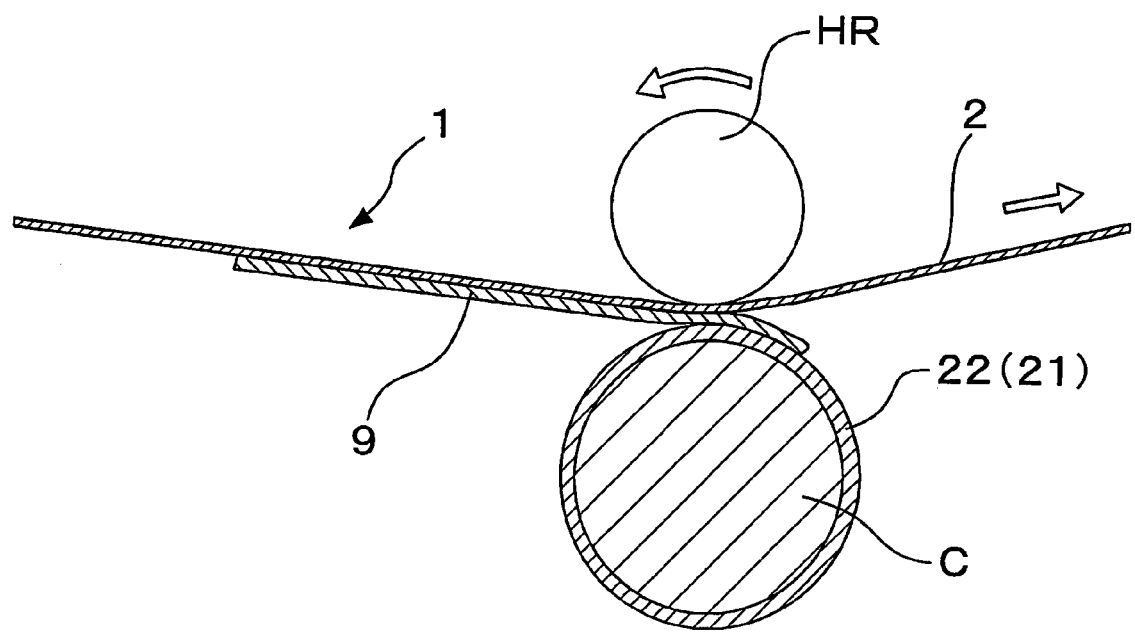
FIG. 3 is an explanatory diagram schematically showing a process of transferring the transfer film to a tubular container.

FIG. 3 is an explanatory diagram showing schematically an example of the hot rolling process for transferring the transfer film 1 to the body wall 22 of the tubular container 21. A core jig C for supporting the body shape is inserted into the body of the tubular container 21. The hot roll HR is heated to a temperature of 220-230° C. and rotated. The adhering film 5 is heat-sealed to the body wall 22 under the condition that the transfer film 1 is sandwiched between the hot roll HR and the core jig C and is pressed to the body wall 22. At that time, the base film 2 is peeled off, and the transferred layer 9 is transferred to the body wall 22.

Figure 4:
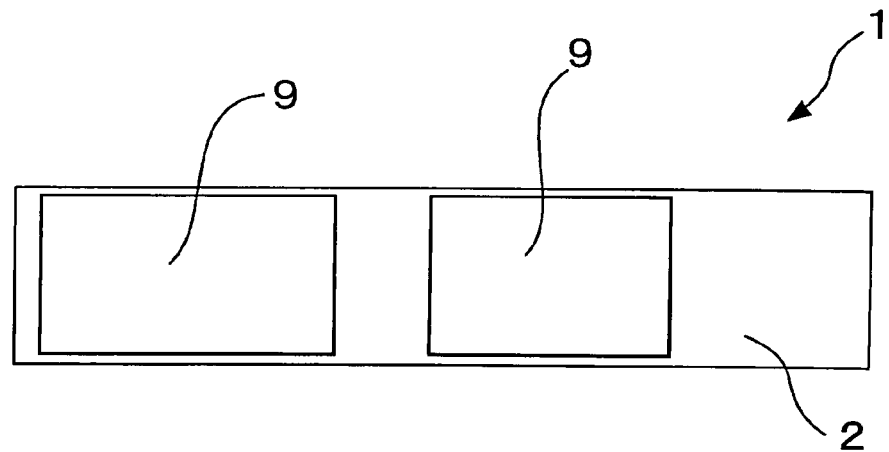
FIG. 4 is a plan view showing an example of the transfer film used in the process of FIG. 3.

FIG. 4 is a plan view of the transfer film 1 used in this process. The transferred layer 9 has been punched in a rectangular shape by a cutting tool as deep as the thickness of the transferred layer 9. The rectangular portions alone of the transferred layer 9 are left there and the rest of the transferred layer 9 has been removed.

The tubular container 21 of FIG. 2 was manufactured and decorated in such a process, and was filled with a creamy cosmetic material. The open lower end of the container 21 was heat-sealed, and the container was tested for its use by squeezing the body repeatedly to discharge the contents. There was no peel-off of the transferred layer 9 from the tubular container 21, no wrinkle occurring, and no cracking of the printed layer 12 or the vapor-deposited layer 13.

Figure 5:
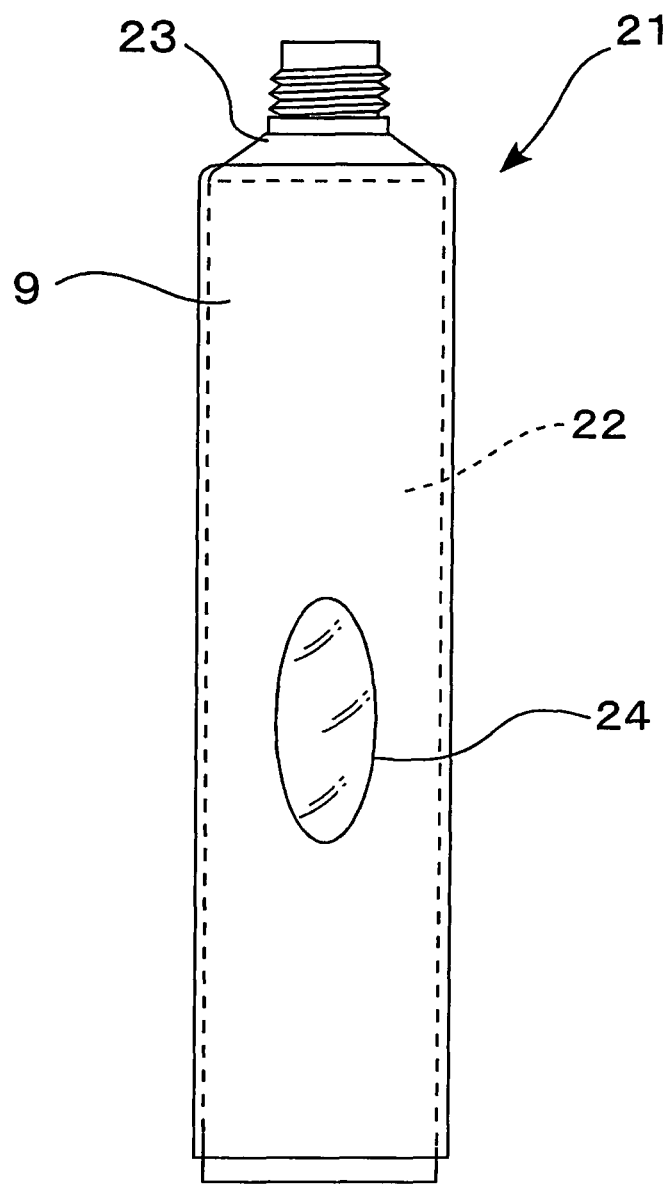
FIG. 5 is a front elevational view of the tubular container in another embodiment of the synthetic resin molded products of this invention.
Figure 6:
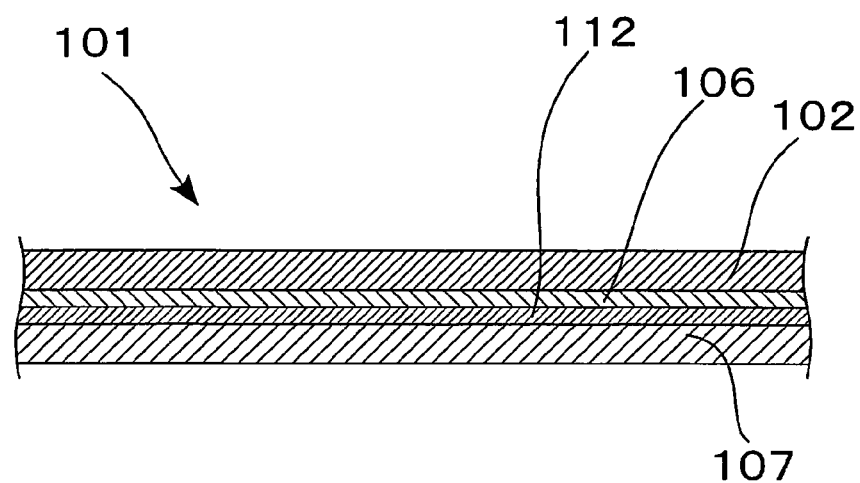
FIG. 6 is a vertical section showing the laminar structure of the transfer film in conventional art.

FIG. 5 is a front elevational view showing a tubular container in another embodiment of the synthetic resin molded product of this invention. In this tubular container 21, an elliptical portion having no decorative layer 11 is formed in the transfer film shown in FIG. 1. This elliptical portion has a function as a window 24, through which the liquid level of the contents can be checked, and adds a convenient feature to the tubular container 21.

The transfer film of this invention is not limited to the above-described embodiments. The film may also be transferred to the body of a thin blow-molded container and can be used by squeezing the body in the same manner as in the case of a tubular container. If the protective film made of a relatively flexible synthetic resin, such as LDPE, is used for the transfer film, and if such film is transferred to the outer surface of a jar container having outer surface made of an AS or ABS resin, then this protective film prevents the jar from being damaged by butting against the corner of a table. The protective film also gives the jar a soft touch. Thus, the transfer film of this invention can be utilized variously for a variety of articles requiring decorations.

Various types of synthetic resins can be selected and utilized for the base film 2, the protective film 3, and the decorative film 4, taking their functions into consideration. The base film 2 is especially required to have toughness for serving as a backing material, processability in the extrusion-laminating process, and heat resistance in the transferring process where the base film 2 passes through the hot roll. As the materials for the base film 2, there may be mentioned biaxially drawn PET film and other polyester-related drawn film, such as biaxially drawn PP film and polybutylene terephthalate; and also nylon-related drawn film. Relatively flexible film is used as the protective film 3. There can be used various synthetic resins having transparency, such as LDPE, linear low-density polyethylene (LLDPE), PP, and polystyrene resins.

The materials selected for the decorative film 4 include a nylon resin and other types of film materials, such as PET and AS, which give clear, high-grade prints and has high contact strength for the printed layer. Depending on the use applications, this decorative film 4 may not be necessary. For example, the decorative layer 11 may be disposed on the underside of the protective film 3, as given by a laminar structure consisting of the base film 2—the protective film 3 (the decorative layer 11)—the adhesive layer 8—the adhering film 5. If the decorative film 4 is allowed to have also the function as the protective film 3, then it is possible for the transfer film to have a laminar structure consisting of the base film 2—the decorative film 4 (the decorative layer 11)—the adhesive layer 8—the adhering film 5.

The base film 2 can also be laminated with the protective film 3 by the dry lamination process using an adhesive layer 8. The adhering film 5 can be selected in response to the material of wall surface of the article to be decorated. Thus, the adhering film 5 made of a PP- or AS-related resin can be used for the containers not made of LDPE but made of a PP or acrylonitrile-styrene copolymer (AS) resin. Depending on the use applications, this adhering film 5 is not necessarily required, and can be adhered to the container wall by using an adhesive layer 8.

Not only the hot rolling process but also the hot stamping process and the in-mold process can be used in the label-transferring step of this invention, depending on the position or extent of transfer and on the nature of the synthetic resin containers and other articles to be decorated.

The synthetic resin molded products of this invention are not limited to the above-described tubular containers that are squeezed and deformed, or to the blow molded containers. The transfer film of this invention can be used also for other products made by various molding processes, such as injection molded products or hot-molded products. Containers for cosmetics, such as the injection-molded compact cases, can be decorated with this transfer film and can be used for a long period without giving damage to high-grade decorations.

INDUSTRIAL APPLICABILITY

As described above, the transfer film of this invention is characterized in that it can be used for a long period in such applications as squeeze deformation without giving damage to the decorativeness. Because this transfer film has decorative effects of high grade, the molded and decorated products have attractive appearance that differentiates these products.

The invention claimed is:

1. A transfer film characterized by comprising:
a base film of a synthetic resin, and
a transfer layer comprising in order:
    a protective film of a synthetic resin made of polyethylene, polypropylene or polystyrene peelably laminated with said base film,
    a first adhesive layer adhered to the protective film,
    a printed or vapor-deposited decorative layer,
    a second adhesive layer, and
    an adhering layer to be adhered to an article to be decorated, the adhering layer being adhered to the second adhesive layer and comprising an adhering film of a synthetic resin which can be directly adhered by heat seal to a wall of the article to be decorated,
wherein a decorative film consisting of a synthetic nylon resin is laminated to a surface of the printed or vapor-deposited decorative layer, facing away from the first adhesive layer, wherein the second adhesive layer is laminated between the decorative film and the adhering layer,
wherein the protective film has sufficient flexibility so that the transfer layer can fully follow on extensive deformation caused by repeated squeezes, and ensure that the printed or vapor-deposited decorative layer is protected against peeling, scratches, or cracking, and
wherein the protective film forms an outer exposed surface of the transfer layer after the base film is removed.

2. The transfer film according to claim 1, wherein the protective film is laminated peelably and directly with the base film by an extrusion laminating process.

3. The transfer film according to claim 1, which comprises the base film made of a polyethylene terephthalate resin, and the protective film made of a low-density polyethylene resin.

4. The transfer film according to claim 1 wherein the decorative layer is the vapor-deposited decorative layer.

5. The transfer film according to claim 1 wherein the synthetic resin of the adhering film is selected from the group consisting of low density polyethylene, polypropylene, and acrylonitrile-styrene copolymer.

6. A decorated molded product of synthetic resins comprising:
a molded product having a wall; and
a transfer layer comprising in order
    a protective film of a synthetic resin made of polyethylene, polypropylene or polystyrene,
    a first adhesive layer adhered to the protective film,
    a printed or vapor-deposited decorative layer,
    a second adhesive layer, and
    an adhering layer adhered to the second adhesive layer, the adhering layer comprising an adhering film of a synthetic resin which can be directly adhered by heat seal to the wall of the molded product to be decorated,
wherein the adhering layer of the transfer layer is adhered to the wall of said molded product by a thermal transfer process,
wherein a decorative film consisting of a synthetic nylon resin is laminated to a surface of the printed or vapor-deposited decorative layer, facing away from the first adhesive layer, wherein the second adhesive layer is laminated between the decorative film and the adhering layer,
wherein the protective film has sufficient flexibility so that the transfer layer can fully follow on extensive deformation caused by repeated squeezes, and ensure that the printed or vapor-deposited decorative layer is protected against peeling, scratches, or cracking, and
wherein the protective film forms an outer exposed surface of the transfer layer.

7. The molded product of synthetic resins according to claim 6 wherein the molded product is a tubular container.

8. The molded product of synthetic resins according to claim 6 wherein the molded product is a blow molded container.

9. The molded product of synthetic resins according to claim 6 wherein the decorative layer is the vapor-deposited decorative layer.

10. The molded product of synthetic resins according to claim 6 wherein the synthetic resin of the adhering film is selected from the group consisting of low density polyethylene, polypropylene, and acrylonitrile-styrene copolymer.

* * * * *